June 15, 1971  K. L. RUGGLES  3,585,094

METHOD OF MAKING MOLDED MULTI-PLY FLEXIBLE LAMINATES

Filed July 2, 1968

INVENTOR.
Kay L. Ruggles

BY
Tennes J Erstad
ATTORNEY

United States Patent Office 3,585,094
Patented June 15, 1971

3,585,094
METHOD OF MAKING MOLDED MULTI-PLY FLEXIBLE LAMINATES
Kay L. Ruggles, Salt Lake City, Utah, assignor to American Standard Inc., New York, N.Y.
Filed July 2, 1968, Ser. No. 742,014
Int. Cl. B29d *21/02;* B29g *5/00;* B32b *17/04*
U.S. Cl. 156—245
6 Claims

ABSTRACT OF THE DISCLOSURE

A multi-ply flexible material for the manufacture of various objects which are stress-subjected and/or have curvilinear surfaces, such as decorative planters, counter tops, wall panels, furniture, plumbing fixtures, etc. formed from a combination comprising a first layer composed of setting mixture including a *polymerizable thermosetting plastic composition,* fine sized silica particles, random sized colored mineral particles, a thixotropic agent, compatible inorganic pigments and *inert fillers,* and a second layer composed of Fiberglas impregnated with polyester and bonded to the first layer to form a relatively rigid, lightweight, flexible, stress-resistant and abusive-resistant object. A *method of manufacturing* the stress-subjected object is also disclosed wherein an object mold is uniformly coated with a gel coat of a polyester resin and the setting mixture is poured onto the coat and the impregnated Fiberglas is placed on top of the coating of setting mixture and bonded thereto to form an integral structure. The integral structure may be removed from the mold prior to final cure of the resin to be formed into a desired curvilinear object. The building material may have many decorative patterns and designs thereon, be relatively lightweight and economical to manufacture.

BACKGROUND OF THE INVENTION

This invention relates to material for the manufacture of various curvilinear and/or stress-subjected objects and a method of manufacturing such objects utilizing the material disclosed.

DESCRIPTION OF THE PRIOR ART

In the past, a number of different types of material for stress-subjected and curvilinear objects have been available. They generally consisted of wood, metal, certain types of plastic, reinforced plastic, etc. Despite the large amount of different materials which have been utilized, a great deal of difficulty has been encountered in efforts to develop a relatively lightweight, stress-resistant, decorative and economical material which can be conveniently formed into complexly shaped objects with a minimum amount of effort and expense. Further, the use of the heretofore known materials for stress-subjected manufactured objects have involved various drawbacks, such as lack of abusive-resistant surfaces, lack of decorative finishes, relatively great weight, high costs, sensitivity to ambient conditions, etc.

SUMMARY OF THE INVENTION

It is an important object of the present invention to provide a novel material for the manufacture of stress-subjected objects overcoming the aforesaid drawbacks.

Another object of the present invention is to provide a method of manufacturing stress-subjected objects utilizing the material of the present invention.

Yet another object of the present invention is to provide an object of manufacture from the novel material which is tough, lightweight, economical to manufacture, weather-resistant and may be provided with a number of different decorative finishes.

It is another object of the present invention to provide a readily formed economical material for the manufacture of stress-subjected objects having monolithic seamless surfaces, said material comprising a multi-ply laminate, a first layer which consists of a setting mixture composed essentially of a combination of a polymerizable thermosetting organic resin, generally uniform particle sized silica, discrete random sized mineral particles, a thixotropic agent, inorganic pigment which is compatible with the mineral particles and an inert filler, and a second layer composed of Fiberglas impregnated with a resin compatible with the setting mixture bonded to the first layer.

Other objects, features and advantages of the invention will become more apparent to those skilled in the art from the following detailed description of the preferred embodiments thereof.

DESCRIPTION OF THE PREFERRED EMBODIMENTS

Figure 1:
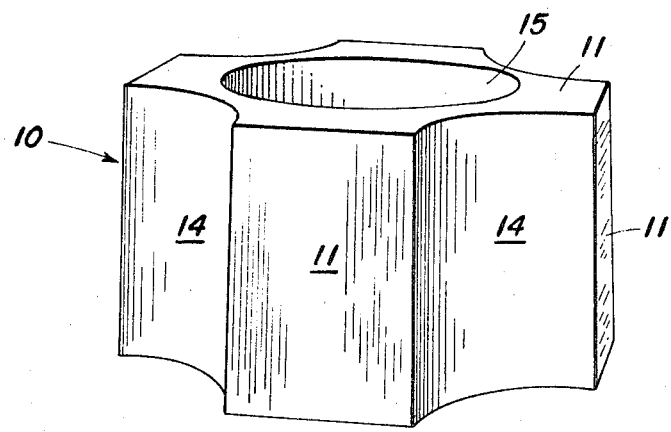
FIG. 1 is essentially a side perspective elevational view illustrating a curvilinear object of manufacture formed from the material of the instant invention.

Formulations used in forming the stress-subjected manufactured objects

The organic resins that are used in the formulation mixture of the instant invention are generally synthetic, relatively high molecular weight resins which exhibit thermosetting properties and are generally shrink-resistant when polymerized into rigid form. The monomers forming these resins may be saturated or unsaturated, but are initially linear in form and interconnect with each other into a network by cross-linkage during their curing or setting process.

Among the resins that are especially useful in the formulation mixture of the present invention are those characterized by their ability to incorporate a relatively large amount of diverse fillers, without cracking, warping or otherwise adversely affecting the properties of the cured resin. Polyesters, epoxies and certain phenolic resins are especially well suited for this purpose, and in addition these resins readily lend themselves to low-pressure and low-temperature molding applications. Generally, the preferred class of such resins are the polyesters and/or modified polyesters.

Polyesters are generally defined as the poly-condensation products of dicarboxylic acids with dihydroxy alcohols. These compounds may be modified by monocarboxylic acids, monohydroxy alcohols and/or polycarboxylic acids and polyhydroxy alcohols. Unsaturated polyesters, which are produced when any of the starting materials contain non-aromatic unsaturation are cross-linked or copolymerized with other unsaturated copolymerizable monomers to form the desired polyester. Unsaturation is thus easily obtained by the use of unsaturated dicarboxylic acids, such as maleic or fumaric acids, although it may also be obtained by the use of unsaturated alcohols, such as allyl alcohol or unsaturated glycols. Unsaturated polyesters are commonly cross-linked with various other unsaturated monomers, such as styrene or diallyl phthalate in order to obtain a three-dimensional structure when the resin is finally cured, which imparts physical properties which are especially useful in certain applications.

The cross-linked polyester resins are thermosetting and when finally cured, are rigid, insoluble, infusible and show very little tendency, if any, to shrink. This is primarily thought to be due to the fact that the cross-linked reaction which polyesters normally undergo is an addition-polymerization reaction, which produces no by-products which could evaporate, etc. to cause shrinkage and formation of pores or the like.

The extent of cross-linkage can be controlled by varying either the amount of unsaturation in the polyester, for example, by the proportions of maleic or adipic acids or by the amount of cross-linking agent. The general practice is to vary the amount of the unsaturation, since the most common polyesters contain about 30% styrene, but require only about 16% to become thermoset. Nevertheless, cross-linking agents which are generally a mixture of catalysts or inhibitors with certain accelerators or promoters, may be used, if desired, to control the amount of cross-linkage. Generally, the substances which serve to catalyze simple esterification reactions catalyze polyesterification reactions as well. These catalysts or inhibitors include benzoyl peroxide, methyl ethyl ketone peroxide, cumene hydroperoxide, organic azo compounds, etc., which may be incorporated within the polyester in concentrations of about 0.01% to about 0.5%. Addition accelerators or promoters may also be added to obtain highspeed gelation at relatively low temperatures for example, such compounds include aliphatic polyamines, dialkyl monoaryl tertiary amines, diethyl aniline, etc., which are generally incorporated into the polyester at concentrations of about 0.1% to 2.0%. Metal compounds also tend to act as promoters, such as the oxides and hydroxides of barium, strontium, magnesium, calcium, etc. as well as more complex compounds such as cobalt naphthenate. In normal practice, the catalyst is incorporated with the polyester during the course of its manufacture, while accelerators are incorporated with the polyester just prior to its use.

Polyester resins are generally classifiable into casting and flexible-type resins for various uses. Generally, the flexible-type polyester contains a much higher degree of saturation than does the casting-type, which is generally somewhat unsaturated, to allow a more rigid three-dimensional network of linkages to occur during setting. The polyesters which have been particularly useful in the manufactured object formulation of the instant invention are a wide mixture of saturated or flexible polyesters and unsaturated or casting polyesters. In general, a casting polyester is the addition copolymerization product of unsaturated dihydric alcohol-dicarboxylic acid, the unsaturation being furnished by maleic radicals therein, which are at least about 60–75 mol percent of the acyl radicals present, the remainder preferably being phthalyl radicals. Often such casting or laminating resins contain a small proportion of a suitable copolymerizable unsaturated monomer such as styrene or diallyl phthalate in order to assist in the cross-linkage process during polymerization; but the general characteristics of these casting or structural unsaturated polyesters are those of the true polyester resin system. In other words, the resin is first obtained by the formation of long polyester chain-like molecules which are formed by condensation in the substantial absence of addition polymerization and result in molecular chains having a plurality of unsaturated maleic (maleyl) radicals therein. When such resins are cured, by addition copolymerization, the maleic radicals form cross-links between the chains thus changing the polymer from linear to three-dimensional and result in a rigid thermoset resin.

A flexible, substantially saturated thermoset polyester may also find exceptional utility in the practice of the instant invention. In this case, the polymerizable polyester is substantially saturated instead of being subtantially unsaturated as just described. Such a resin may be an ethylene-glycolphthalate having perhaps 1–10 mol percent and preferably 2–5 mol percent of the acid radicals such as maleic radicals and the remainder as phthallyl radicals. The flexible and casting (substantially rigid) polyester resins are both readily available commercially and are so designated in the industry. The preferred resins are available under the trade name "Laminac." These resins are generally a mixture of about 30–50% saturated polyester and about 70–50% unsaturated polyester, but are available at various ratios. In the practice of the instant invention, it has been found to be preferable that the ratio of flexible to casting resin be substantially in the range of 100:1 to 1:100, with the actual degree of flexible resin present being determined by how much bending or the like the manufactured part must take without cracking of the surface. In addition, these polyester resins may be styrene-modified to improve still further impact characteristics. One of the particular flexible resins especially adapted for use in the instant formulation is available under the trademark "Laminac–126," while one of the particular casting-type resins especially adapted for use in the instant formulation is available under the trademark "Laminac–136–3."

These polyester resins show excellent ability to incorporate relatively large amounts of diverse fillers. The resins are generally incorporated into the final formulation mixture so as to constitute about 20% to 50% by weight of the overall setting mixture. The resin incorporated into the final mixture is sufficient to bind the filler material into an integral mass possessing the necessary physical properties, etc., whereby the resin serves as the matrix of the overall formulation mixture producing a synergistic combination of properties which are exceptionally useful in building material formulation applications.

Generally uniform, fine particle sized silica is also incorporated into the formulation setting mixture of the instant invention as one of the essential ingredients of the building material formulation. The size of the silica particles gives a generally uniform characteristic to the final formulation and also allows equal distribution of the silica particles throughout the entire formed mass. Although other fine sized particle materials may be used, silica is preferred, as it is relatively lightweight, imparts improved water resistance to the final product, reduces surface "crazing" of the molded product and produces a substantially smoother surface with reduced porosity. Reduction of surface crazing (random cracks caused on the surface of the molded product from the uneven and/or excessive distribution of heat strain during the final curing process) is thought to be due in part to the reduction in exotherm as the filler tends to absorb a certain amount of heat of the polymerization (which is an exothermic reaction). The slower cure and reduction in a peal heat reduces strain and is helpful in eliminating surface and/or internal flaws due to the extreme variations in internal heat. Silica particles also improve other surface characteristics due to their fine size and even distribution within the polyester matrix, which tends to "hold" the polyester on the mold and reduce flow in the mold. Further, silica particles tend to be somewhat opaque and/or transparent and thus tend to improve the appearance of pigmented parts due to the imparting of opacity to the filled resin, thereby increasing the hiding power of the pigments used. In other words, the silica particles tend to result in a pigment part that has a "warm" color.

Preferably, the silica particles are in the 130 to 160 mesh size range and constitute at least 5% by weight of the overall material formulation, even though amounts up to and including 40% to 60% are suitable for certain uses.

Discrete random sized mineral particles are also an essential ingredient in the instant material formulation mixture. Generally, it is preferable to use colored mineral particles as they tend to lend a decorative design or finish to the polyester matrix, especially to the formed integral unit. A relatively large variety of minerals are suitable for this purpose. It is generally preferable that these mineral particles be inert in regard to the polyester per se and not interact with the polyester resin. The minerals are preferably in discrete, particulate form having a size variation ranging from 0 to 150 mesh and include the following minerals: silica, sand, graphite, marble, slag, granite, chalcedony (including quartz, agate, cornelian, chrysoprase, bloodstone, jasper, onyx, plasma, prase, moss agate, sardonyx and similar minerals) and various other natural colored aggregates and mixtures thereof. The discrete random size mineral particles are generally uniformly intermixed with the polyester-silica flour mixture in amounts varying from about 15% by weight to about 80% and preferably in amounts of 20% to 40% by weight, so as to become uniformly distributed throughout the polyester matrix. The mineral particles enhance the decorative design of the overall manufactured object so that it resembles more expensive materials such as natural marble, travertine, slate, etc. The manufactured object of the instant formulation has more suitable physical properties than those of the more expensive natural materials. For example, natural marble tends to be fragile and quite porous, while the formulation of the instant invention yields manufactured objects that are impact-resistant, stain-resistant, abrasion-resistant, non-porous, tough, etc. so as to be exceptionally well suited for normal uses wherein decorative manufactured objects are desired.

The use of the random sized mineral particles allows proper "stacking" of the minerals in the polyester matrix thereby reducing settling or classification when the formulation setting mixture is poured onto a vibrating mold surface. Settling is not desirable as it will unbalance a cast material, i.e., the lower surface will have a different average density than the upper surface, thereby inducing a greater tendency toward warping and the like. Further, it will also tend to change the resin content throughout the strata of the casting, which causes variations in the physical properties of the casting. The resin tends to shrink about 5–7% during curing so that any change in resin content during the casting will cause differential forces and strains to be present during the cure. This will result in the molded article being warped, unless, of course, it is either restrained by a matching mold or fixture or through the shape of the article itself, i.e., as in two-way curvature. The use of the heavier mineral particles in the formulation mixture tends to break up the colored veining into a more decorative effect, so as to achieve a "natural" look.

A relatively small amount of a suitable thixotropic agent, such as colloidal silica, various fine clays, etc., are also incorporated into the formulation mixture to prevent the filled resin from "running-off" of the vertical or angular portions of the mold. Relatively small amounts of the thixotropic agent, preferably colloidal silica, are incorporated into the filled resin to achieve a viscosity suitable for use on the object mold so that the resin substantially remains in all portions of the mold without running-off. Generally at least about 0.1% by weight, of colloidal silica is added to the resin mixture, however, amounts up to about 1% may be added.

In addition, a small amount of an inorganic pigment having a color compatible with the discrete mineral particles is also incorporated with the formulation mixture to achieve a more decorative design and better eye appeal. The pigment may be a contrasting color that accentuates the color and/or texture of the mineral particles, a complementary color that combines with the color of the mineral particles to produce a natural hue, an identical color to that of the mineral particles to uniformly color the molded article, or any other color or mixtures thereof compatible with the color of the mineral particles to produce a decorative design on the molded product. The pigments are characterized by heat and light fastness and are chemically stable. It is preferable to add the pigments to the mixture in a dry, finely powdered state as this prevents various problems encountered in regard to the use of an oil or solvent to dissolve the pigment and in regard to the possible effect that such an oil and/or solvent may have on the various other properties of the polyester resin mixture. Generally, about 2% to 15% by weight of the compatible inorganic pigment is sufficient to color the formulation mixture to the desired color.

For certain uses, such as commercial objects wherein excessive abrasive wear is expected, it is desirable to incorporate certain inert fillers that are abrasion-resistant and do not detract from the properties of the overall formulation mixture. Such inert fillers include polyethylene powder, cellophane fibers, nylon fibers, rayon fibers, asbestos shreds, glass fiber shreds, and mixtures thereof, etc. Polyethylene powder has been found to be exceptionally well suited for normal commercial objects that undergo excessive abrasion, such as by metallic objects, etc., which frequently are sliding or otherwise moving thereon. Generally, 10% to 30% by weight of the inert filler (preferably polyethylene powder) is intermixed with the various other ingredients so as to be uniformly dispersed throughout the polyester matrix.

The materials of the instant formulation setting mixture, i.e., the polymerizable thermosetting organic resin, the generally uniform fine particle sized silica, the colored discrete random sized mineral particles, the thixotropic agent, the inorganic pigment, and the inert fillers may all be substantially placed in an appropriate blender and intermixed therein to cause a substantially homogeneous formulation setting mixture. Of course, if desired, the ingredients may also be individually blended into the resin mixture, so long as the optimum proportions, as hereinbefore set forth for the various ingredients are added, the order of addition is relatively unimportant.

In certain specific decorative designs, such as a marble finish, it is preferable to prepare two separate formulation mixtures, whereby the first portion of the formulation mixture that is initially applied to the mold, i.e., forming the outer rigid surface of the molded manufactured object, is predominately a coloring mixture. That is, the first portion contains the major proportion of the coloring material of the overall formulation mixture. Thus, for example, in a "marble" formulation, which forms, for example, the planter or bench unit resembling that made from natural marble, the "veining" mix contains about 30% polymerizable thermosetting organic resin, 60% of the appropriately colored discrete random sized (generally 10 through 150 mesh) mineral particles and about 10% inorganic pigment having a color complementary to the mineral particles. The second portion of such a marble formulation contains the remainder of the ingredients and is poured on top of the first formulation portion so that the second portion reinforces or acts as a base for the first portion. Upon curing, the two portions form a substantially homogeneous, monolithic, seamless unit which is free of lamination and actually comprises a single layer of material. Of course, prior to the actual final cure of the resin, the fiberglass impregnated with a suitable polyester resin is placed thereon and bonded thereto to form the integral molded object.

It will, nevertheless, be appreciated that a single generally uniform formulation mixture may be used to form a solid color formulation or an aggregate color formulation. Generally, the formulation of two separate portions is only necessary when a particular color or portion thereof is to be concentrated in a particular design pattern, such as marble veining, so that the remainder of the formulation serves as a background for the concentrated colors.

The following formulation mixtures more clearly set forth certain material formulations, however, these formulations are intended only to be illustrative and are not to be considered as limiting the scope of the invention in any way.

FORMULATIONS FOR FILLED POLYESTER MIX USED IN MATERIALS (I) Marble formulation (a) Base mix: Percent
(1) Polyester, epoxy, phenolic or other thermosetting resin _____ 30–35
(2) 140–150 mesh ground silica flour _____ 20–35
(3) Onyx sand fines, 150 to 10 mesh random selection _____ 30–30
(4) Colloidal silica (thixotropic agent) _____ .2
(5) Inorganic pigment _____ 4–6

(b) Marble veining mix:
(1) Polyester, epoxy, phenolic or other thermosetting resin _____ 30
(2) Onyx sand fines, 150 to 10 mesh random selection _____ 60
(3) Inorganic pigment _____ 10

(II) Solid color formulation (1) Polyester, epoxy and other thermosetting resin _____ 30–55
(2) 60 mesh silica sand _____ 20–35
(3) 140–150 mesh ground silica flour _____ 20–35
(4) Colloidal silica (thixotropic agent) _____ .2
(5) Inorganic pigment _____ 4–6

(III) Aggregate formulation (1) Polyester, epoxy and other thermosetting resin _____ 30–35
(2) Natural colored aggregate #0 size to 16 mesh _____ 20–35
(3) 140 mesh ground silica _____ 20–35
(4) Colloidal silica (thixotropic agent) _____ .2–.5
(5) Inorganic pigment _____ 4–6

While the formulation mixtures described hereinbefore are generally suitable for use in the manufacture of objects which are relatively non-stress subjected and/or lack curvilinear surfaces, they are, nevertheless, somewhat unsuited for manufactured objects which are stress subjected and/or have curvilinear surfaces. Objects manufactured from the formulation mixtures per se tend to be somewhat non-resilient, non-flexible, brittle, non-stress-resistant, etc., even though such objects generally exhibit superior physical properties to similar objects manufactured from natural products, such as marble, slate, etc. For example, a piece of polyester resin sheet (formed from the aggregate formulation as set forth hereinbefore) is found to crack or craze when it is bent through a relatively small arc or placed under any substantial stress. Moreover, it has now been found that the polyester resin sheet (or similarly manufactured object) may be rendered stress-resistant by incorporating or bonding to the body portion thereof, a sheet or matting of Fiberglas impregnated with a compatible resin that will adequately bond to the body portion. While other flexible and resilient materials may also be used, it will, nevertheless, be appreciated that Fiberglas is preferred as it is relatively lightweight, flexible, stress-resistant, economical, compatible with polyester resins so as to form a bond with the polyester resin formulation mixture without detracting from the desired properties of the polyester resin. While Fiberglas objects of one type or another have generally been known, it has not been generally known as a means for producing Fiberglas manufactured objects having decorative finishes. The present invention now provides for various decorative finishes with Fiberglas backing so that the formed objects have all the desirable properties of fiberglass and yet maintain the decorative finishes and other desirable properties of the mineral filled polyester resin mixtures.

As shown in FIG. 1, a manufactured object 10, for example, a planter, having flat surfaces 11 interconnected on the outside by curvilinear surfaces 14 and connected on the inside by cylindrical surface 15 is manufactured from the material of the instant invention. In order to achieve aesthetic and functional characteristics suitable for such use it is desirable to form various complex shapes, whereby at least certain portions of the object are stress subjected but do not undergo surface cracking or the like.

Figure 2:
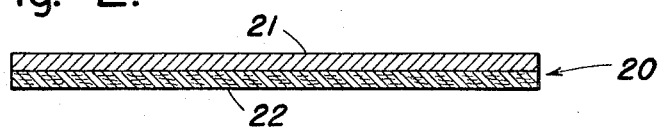
FIG. 2 is a diagrammatical elevational end view showing an embodiment of the formed lamina of the instant invention.

As shown in FIG. 2, in order to achieve a substantially rigid yet stress-resistant object, the fiberglass layer 22 is impregnated with a suitable polyester resin and bonded to a layer of the formulation mixture 21 to form an integral unit 20. The fiberglass layer 22 is substantially coextensive with the formulation mixture layer and is integrally bonded thereto to form an integral unit therewith. The fiberglass member 22 may be of any desired thickness preferably the thickness of the setting mixture to the fiberglass mixture is in the range of 1:1 to 1:4. The multi-ply lamina thus formed is generally capable of being flexed through an arc of at least 20° so as to be substantially stress-resistant and suitable for formation of various complex and/or curvilinear shapes.

Fiberglass comes in many forms, such as matting, rolling, shorts, long fibers, etc., and is well known in the art. Generally, fiberglass undergoes surface preparation in order to render it compatible with various polyester and/ or other organic resins. Once the fiberglass has been properly prepared, it is impregnated with the particular resin utilized and allowed to cure whereby the fiberglass is uniformly distributed throughout the resin and imparts its physical properties to such resin mixture. Thus, in the present invention, the fiberglass is preferably surface treated so as to be compatible with a polyester resin bondable to the formulation mixture of the instant invention and the impregnated fiberglass is placed upon the formulation mixture just prior to its final curing and allowed to cure with the setting mixture so as to form an integral unit therewith. The formed unit obtains all of the stress-resistant properties of fiberglass along with all of the abuse-resistant properties of the mineral filled polyester resin formulation mixture.

Figure 3:
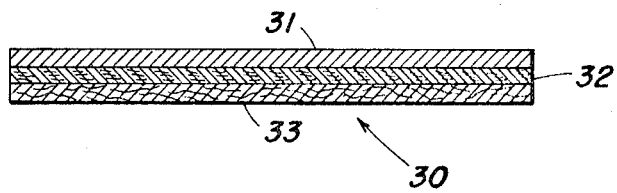
FIG. 3 is a diagrammatical elevational end view showing another embodiment of the formed lamina of the instant invention.

As shown in FIG. 3, a manufactured object 30 may be formed utilizing an outer layer 31 composed of the formulation mixture of the instant invention, having an intermediate layer 32 formed of fiberglass impregnated with a suitable polyester resin bonded thereto and having a third layer 33 of bulk material, such as plywood, wood, foam, metal, etc., laminated thereto for additional stiffness or reinforcement. As will be appreciated, the use of the formulation mixture not only substantially reduces the cost of the manufactured object, but in addition provides a mineral surface which is exceptionally well suited for weather-resistance, decorative finishes, etc., all of which are not possible by the use of mere fiberglass finishes and/ or other building material finishes.

Figure 4:
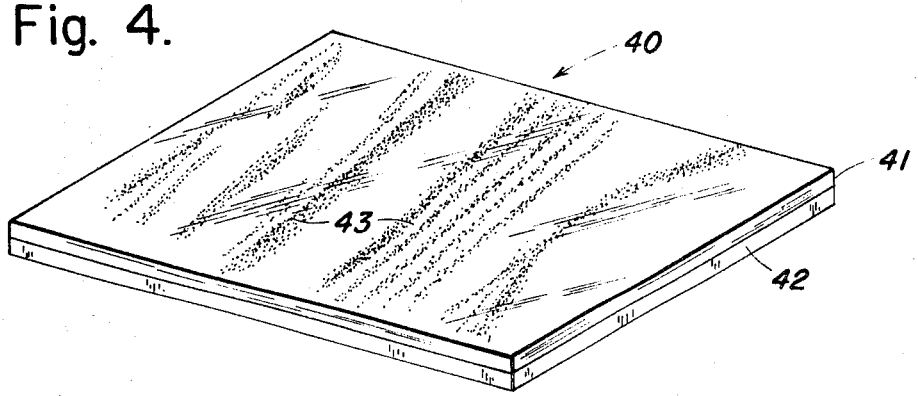
FIG. 4 is essentially a top plan view of a formed lamina utilizing the material of the instant invention illustrating a decorative finish thereon.

FIG. 4 illustrates an embodiment of the invention wherein a multi-ply panel or the like 40 is formed in accordance with the teaching of the principles of the instant invention. A first layer 41 is composed of a formulation mixture as described hereinbefore, having a decorative pattern 43 on the outside surface thereof, and having a second layer composed of fiberglass impregnated with a compatible resin bonded to said first layer 41, forming the multi-ply panel. The manufactured object 40 is formed by coating an appropriate mold with a gel coating of, for example, polyester resin, and pouring a first portion of the formulation mixture into the object mold, removing any excess therefrom, and then placing an impregnated fiberglass matting thereon and allowing the entire lamina to cure. If desired, the lamina may be removed from the mold prior to the final curing thereof and curved into various complex shapes, as desired.

PROCESS OF MANUFACTURING THE STRESS-SUBJECTED MATERIAL

Generally, the apparatus for manufacturing the various stress-subjected objects, such as vanities, lavatories, panels, planters, etc., include suitable smooth mold areas having adjustable outer perimeters for various sized objects or for irregularly shaped mold areas, which mold areas may or may not be flexible depending upon the object being manufactured. The mold areas are cleaned, waxed and sprayed with a suitable release agent, such as polyvinyl alcohol. The pre-prepared mold surface is then coated with a relatively thin layer of a polyester gel coat, which is either clear or pigmented, depending upon the design to be utilized on the object. The coating material is then allowed to set to a tacky surface at ambient temperatures, however, heat may be added to accelerate the cure time if desired.

The formulation mixture, as set for hereinbefore (which may be a first mixture, as in the marble formulation or may be a uniform formulation as in the solid color formulation), is carefully measured out and poured onto the gel coat. The formulation mixture is carefully spread throughout the mold area and any excess thereof is carefully removed before gelling with a spatula or putty knife to insure that sufficient room is left for the Fiberglas matting. A plurality of objects can be contemporaneously poured by merely continuing the pour over a plurality of mold areas. An appropriately shaped and sized Fiberglas member, in matting, roving or the like form, is impregnated with a suitable polyester resin and mounted on top of the poured mixture so as to be coextensive with the mold area and the formulation mixture surface. Preferably, the Fiberglas is placed on top of the formulation mixture while it is still in a relatively tacky state and prior to its final cure. The formulation mixture and Fiberglas are then vibrated by an appropriate vibrator to contract the formulation mixture against the mold surface and remove any trapped air therefrom. The formulation mixture is then allowed to gel until firm (generally no more than 30 to 40 minutes). The mold is vibrated to insure complete bonding between the two layers so that a single substantially integral combination of materials occur. Where two separate pours of formulation mixture are utilized, as in marble veining, a first pour is placed on top of the gel coat and the mold is vibrated until the first pour becomes tacky and then the second pour is placed thereupon and again the mold is vibrated until the entire mixture is tacky and then the Fiberglas matting or the like is placed on top thereof and the mold is again vibrated until the entire combination gels. If desired, the formed object may then be removed from the mold prior to final cure and *curved into any desired complex shape* or, if desired, the mold may be flexed into the desired shape. In addition, after the formulation mixture has achieved a gel state, the Fiberglas laminate may be applied by any commercial method of Fiberglas laminating, such as spray-up, lay-up, filament winding, centrifugal casting, match die molding, etc. After the desired shape of the object is obtained, the material is allowed to cure for about 3 to 4 hours, with heat added, if desired, to accelerate the final cure stage. Once the material of the formulation mixture has been fully cured, the object is removed from the mold by appropriate means. After the unit has been removed from the mold, it is finished by grinding off excess material where appropriate, polishing, etc. The object is then ready to be shipped to an appropriate location for installation and use.

Although various modifications may be suggested to those versed in the art, it should be understood that I wish to embody within the scope of the patent warranted hereon, all such modifications as reasonably and properly coming within the scope of my contribution to the art.

I claim as my invention:

1. A method of manufacturing a fixed flexible material lamina which comprises:

forming a setting mixture of a polymerizable thermosetting polyester, said polymerizable thermosetting polyester comprising flexible and casting polyester resins having a ratio in the range from 100:1 to 1:100, discrete random sized colored mineral particles, colloidal silica, inorganic pigment and inert filler, coating an object mold area with a substantially uniform layer of a polyester resin, gelling said coating of polyester resin, pouring said setting mixture over the mold area, removing excess setting mixture from the mold area prior to the setting thereof, curing said setting mixture to a gel state, applying a fiberglass matting impregnated with a compatible polyester resin onto the setting mixture, bonding said fiberglass to said setting mixture into a single integral lamina and separating the formed lamina from the mold area.

2. Method of claim 1 wherein said setting mixture comprises a mixture of 20% to 45% by weight of said polymerizable thermosetting polyester, 15 to 40% by weight of discrete random sized colored mineral particles, 0.1% to 1.0% by weight of colloidal silica, 2% to 15% by weight of an inorganic pigment and the remainder inert filler.

3. The method of manufacturing as defined in claim 2 wherein the setting mixture is composed of a first and second portion, said first portion comprising a mixture of 20% to 35% by weight of a polymerizable thermosetting polyester resin, 50% to 80% by weight of 0 to 150 mesh chalcedony particles and 5% to 15% by weight of an inorganic pigment having a compatible color in relation to the chalcedony particles, said second portion comprising a mixture of 20% to 40% by weight of a polymerizable thermosetting polyester resin, 15% to 40% by weight of 130 to 160 mesh silica flour particles, 25% to 35% of 0 to 150 mesh chalcedony particles, 0.1% to 0.5% by weight colloidal silica and 3% to 10% by weight of an inorganic pigment having a compatible color in relation to the chalcedony particles, pouring said first portion over the coated mold area, vibrating the first portion over the coated mold area, vibrating the first portion covered mold area until said portion gels, pouring said second portion over the surface of the first portion, removing the excess of the second portion prior to the gelling thereof, vibrating the entire mold area to integrate said first and second portions into a substantially homogeneous single layer.

4. The method as defined in claim 2 wherein the lamina is removed prior to hardening and formed into a desired curvilinear shape.

5. Method of manufacturing objects which comprises, applying a release agent to a prepared surface, and applying a layer of a polyester gel coat to a prepared surface, and allowing the gel coat to become tacky, and adding a formulation mixture on top of the gel coat, said formulation mixture including a combination of a polymerizable thermosetting organic resin, generally uniform fine particle sized silica, colored discrete random sized mineral articles, thixotropic agent, compatible inorganic pigment and inert filler, and adding fiberglass reinforcing impregnated with a polyester resin on top of the formulation mixture prior to the final cure, then shaping the final object to the final shape prior to the final cure.

6. Method of claim 5 wherein said formulation mixture comprises the combination of flexible casting resin the ratio of flexible to casting resin being in the range of 100:1 to 1:100, said resin being selected from the group consisting of polyester, epoxy, phenolics and mixtures thereof.

(References on following page)

References Cited

UNITED STATES PATENTS

| | | | |
|---|---|---|---|
| 3,492,394 | 1/1970 | Heine | 264—213X |
| 3,499,954 | 3/1970 | Trojan et al. | 264—213X |
| 3,502,767 | 3/1970 | Morrison et al. | 264—324X |
| 3,516,957 | 6/1970 | Gray et al. | 264—300X |
| 3,520,967 | 7/1970 | Kreier | 156—245X |
| 2,058,295 | 10/1936 | Burbank et al. | 264—71 |
| 2,327,765 | 8/1943 | Carver | 264—213 |
| 2,817,619 | 12/1957 | Bickel et al. | 156—232X |
| 3,001,900 | 9/1961 | Frieder | 264—273X |
| 3,189,337 | 6/1965 | North | 266—2.5 |
| 3,393,106 | 7/1968 | Marrinan et al. | 264—213X |
| 3,420,729 | 1/1969 | Roberts | 156—245X |
| 3,444,032 | 5/1969 | Kreier | 156—245X |

HAROLD ANSHER, Primary Examiner

U.S. Cl. X.R.

156—246, 289; 161—165, 185, 195; 264—71, 213, 273, 300, 324, 325